US006900849B1

(12) United States Patent  (10) Patent No.: US 6,900,849 B1
Friedreich  (45) Date of Patent: May 31, 2005

(54) SIGNAL PROCESSING APPARATUS HAVING MEANS FOR REDUCING THE POWER CONSUMPTION

(75) Inventor: Willibald Friedreich, Vienna (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 570 days.

(21) Appl. No.: 09/399,606

(22) Filed: Sep. 20, 1999

(30) Foreign Application Priority Data

Sep. 25, 1998 (EP) ............................................. 98890272

(51) Int. Cl.⁷ ................................................ H04N 5/63
(52) U.S. Cl. .......................... 348/730; 315/86; 315/411; 307/31
(58) Field of Search ........................... 348/730; 315/86, 315/411; 307/31, 34, 112, 139, 140; H04N 5/63

(56) References Cited

U.S. PATENT DOCUMENTS

| 5,013,980 | A | * | 5/1991 | Stephens et al. ............ 315/411 |
| 5,036,261 | A | * | 7/1991 | Testin .......................... 315/411 |
| 5,327,172 | A | * | 7/1994 | Tan et al. ................... 340/3.44 |
| 5,477,279 | A | * | 12/1995 | Chang ......................... 348/730 |
| 5,523,851 | A | * | 6/1996 | Leshem ........................ 386/46 |
| 5,634,798 | A | * | 6/1997 | Suh ............................ 348/725 |
| 5,636,288 | A | * | 6/1997 | Bonneville et al. ........... 363/79 |
| 5,900,913 | A | * | 5/1999 | Tults .......................... 348/468 |
| 6,212,326 | B1 | * | 4/2001 | Dumont et al. ............... 386/46 |
| 6,285,406 | B1 | * | 9/2001 | Brusky ....................... 345/211 |

\* cited by examiner

*Primary Examiner*—Brian P. Yenke
(74) *Attorney, Agent, or Firm*—Edward W. Goodman

(57) ABSTRACT

A signal processing apparatus (1) includes a power supply input (20), a power supply connection (30) and a power supply output (27). A supply voltage generator (33) is connected to the power supply input (20) via disconnection circuit (72). A detector (70), provided in the area of the power supply connection (30), enables a supply of power to the power supply output (27) to be detected and, when a supply of power to the power supply output (27) is detected, enables the disconnection circuit (72) to be set, via a control circuit (73), to a state in which the power supply input (20) and the supply voltage generator (33) are connected.

6 Claims, 2 Drawing Sheets

SIGNAL PROCESSING APPARATUS HAVING MEANS FOR REDUCING THE POWER CONSUMPTION

BACKGROUND OF THE INVENTION

1. Field of the Invention

The invention relates to a signal processing apparatus adapted to supply signals to a second apparatus and including the means defined hereinafter, namely, power supply input means to which electric power can be applied, and power supply output means to which power supply input means of the second apparatus can be connected, and power supply connection means via which the power supply output means is connected to the power supply input means and via which at least a part of the power applied to the power supply input means can be applied to the power supply output means, and supply voltage generating means connected to the power supply input means and capable of generating at least one supply voltage, and signal processing means to which a supply voltage generated by the supply voltage generating means can be applied and by which at least one signal can be processed, the signal processing means being adapted to supply at least one processed signal to be transferred to the second apparatus, and signal output means to which the processed signal can be applied and to which signal input means of the second apparatus can be connected.

2. Description of the Related Art

Such a signal processing apparatus of the type defined in the opening paragraph is commercially available in several variants and is consequently known. The known signal processing apparatus is a video recorder for recording and reproducing video signals and audio signals on a magnetic tape. A television receiver can be connected to the known video recorder as a second apparatus. Activable line voltage switching means enable the known video recorder to be set from power-off mode to a power-on mode, and also to a standby mode. In the power-on mode, the supply voltage generating means is constantly connected to the power supply input means and the supply voltage generating means supplies power to all the video recorder parts to be powered and, consequently, also to the signal processing means which is adapted to supply at least a processed signal to be transferred to the television receiver, and which is basically formed by an antenna amplifier. When the known video recorder is in the standby mode, the supply voltage generating means is also constantly connected to the power supply input means, and the supply voltage generating means supplies at least the supply voltage required to power the signal processing means which serves to supply at least a processed signal to be transferred to the television receiver. This supply voltage is applied to the signal processing means, as a result of which the signal processing means, which is basically formed by an antenna amplifier, is also fully operable in the standby mode, thus enabling signals received by means of an antenna of the known video recorder to be processed, so that, subsequently, via the signal output means of the known video recorder, the processed signals can be applied to the signal input means of the television receiver connected to the known video recorder, and can be reproduced by means of this television receiver.

Thus, in the known video recorder, the situation occurs that in the standby mode of the video recorder, the supply voltage generating means and the signal processing means are active so as to enable the connected television receiver to operate in the reproducing mode via the known video recorder, which leads to the disadvantage that both the supply voltage generating means and the signal processing means consume power even when the television receiver connected to the video recorder is not active and this television receiver is, consequently, not in a reproducing mode. Since this operating condition, in which the known video recorder is in its standby mode while the connected television receiver is not active and does not perform a reproducing function, generally persists for a comparatively long time, this leads to a comparatively high unnecessary power consumption, which is disadvantageous and undesirable.

SUMMARY OF THE INVENTION

It is an object of the invention to preclude the aforementioned problems and to provide an improved signal processing apparatus in which an unnecessary power consumption, for example, in the standby mode of the signal processing apparatus, is wholly avoided or at least reduced to a practically insignificant value.

According to the invention, in order to achieve this object in a signal processing apparatus of the type defined in the opening paragraph, detection means have been provided in the area of the power supply connection means, the detection means being adapted to detect the occurrence or non-occurrence of a supply of power to the power supply output means and, when the non-occurrence of a supply of power to the power supply output means is detected, to generate and supply a first detection signal and, when the occurrence of a supply of power to the power supply output means is detected, to generate and supply a second detection signal, and disconnection means have been provided between the power supply input means and the supply voltage generating means, the disconnection means being adapted to disconnect the supply voltage generating means from the power supply input means in the case of an occurrence of the first detection signal, and to connect the supply voltage generating means to the power supply input means in the case of an occurrence of the second detection signal, the supply voltage generating means then being capable of generating at least the first supply voltage to be applied to the signal processing means and of applying this supply voltage to the signal processing means.

By taking the measures in accordance with the invention, it is achieved in a simple manner that only when the second apparatus connected to the signal processing apparatus in accordance with the invention is activated and remains activated and, consequently, consumes power upon its activation, this condition is detected by the detection means of the signal processing apparatus in accordance with the invention and, as a result of this, the supply voltage generating means, which until then was disconnected from the power supply input means with the aid of the disconnection means, is connected to the power supply input means with the aid of the disconnection means, and is thus enabled to generate at least the supply voltage required for the power supply of the signal processing means, which serve to supply at least a processed signal to be transferred to the second apparatus, and to apply this voltage to said signal processing means. This guarantees that, for example, also when the signal processing apparatus is in the standby mode, while the second apparatus is in the off state, the supply voltage generating means is disconnected from the power supply generating means and, consequently, does not generate and supply a supply voltage and, consequently, no supply voltage is applied to the signal processing means, as a result of which, there is no unnecessary power consumption. It is to be kept in mind that the circuit design of the disconnection means may be different. The disconnection means can be implemented, for example, with the aid of a relay-like switch having mechanical switch contacts, in which case, the supply voltage generating means is fully electrically isolated from the power supply input means, so that no power at all is consumed in a signal processing apparatus in accordance with the invention when the disconnection means is in the disconnecting state. However, in an advantageous manner, the disconnection means may be formed by electronic switches, in which case there can be some power consumption caused by leakage currents, but, in practice, this is negligible.

In a signal processing apparatus in accordance with the invention, the detection means can, in fact, be connected directly to the disconnection means and the first detection signal and the second detection signal can then be supplied directly from the detection means to the disconnection means for control purposes. However, in practice, it has proven to be advantageous when control means realized with the aid of a microprocessor have been provided between the detection means and the disconnection means. This is in particular because such a control means enables a greater variety of control possibilities to be realized.

The measures taken in a signal processing apparatus, where the signal processing apparatus takes the form of a video recorder to whose power supply output means and signal output means the power supply input means and the signal input means of a television receiver forming the second apparatus can be connected, have proven to be particularly advantageous, and, in this case, the additional measures that the signal processing means is formed by an antenna signal processing stage in combination with a signal splitting stage, and that the signal processing means is formed by a video/audio input/output stage, have proven to be particularly advantageous.

The measures that the detection means includes potential isolating means which provides an electrical isolation between the power supply connection means, arranged at the input side of the detection means, and the output side of the detection means, have also proven to be advantageous because they preclude problems known per se, which may be caused by undesired potential influences.

The aforementioned as well as further aspects of the invention will become apparent from the examples of embodiments described hereinafter and will be elucidated with reference to these examples.

BRIEF DESCRIPTION OF THE DRAWINGS

The invention will now be described in more detail with reference to two embodiments shown in the drawings and given by way of example but to which the invention is not limited. In the drawings.

DESCRIPTION OF THE PREFERRED EMBODIMENTS

Figure 1:
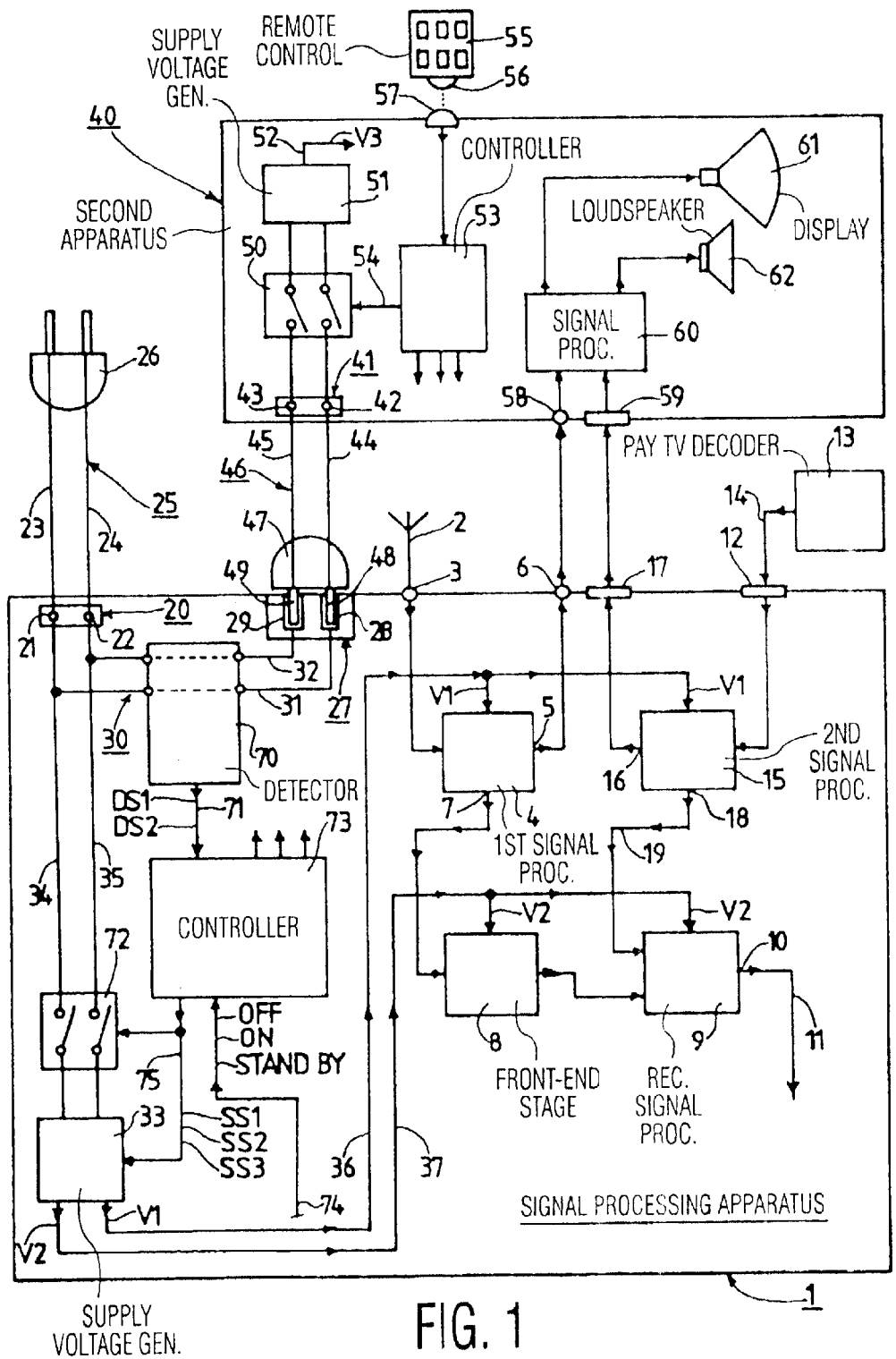
FIG. 1 is a block diagram which diagrammatically shows a relevant part of a signal processing apparatus in accordance with a first embodiment of the invention, and a second apparatus which cooperates with the signal processing apparatus in accordance with the invention.

FIG. 1 shows a part of a signal processing apparatus 1, which in the present case takes the form of a video recorder.

The signal processing apparatus 1 is adapted to receive signals. For this purpose, an antenna 2 has been provided which is connected to first signal input means 3 of the signal processing apparatus 1. First signal processing means 4 is connected to the first signal input means 3. The first signal processing means 4 is formed by an antenna signal processing stage in combination with a signal splitting stage, which is known per se. The first signal processing means 4 has a first output 5 connected to first signal output means 6 of the signal processing apparatus 1. The first signal processing means 4 has a second output 7 connected to a so-called front-end stage 8. By means of such a front-end stage, the signal supplied by the first signal processing means 4, which basically corresponds to the received antenna signal, can be converted into a signal which can be processed by recording signal processing means 9 connected to the front-end stage 8. The recording signal processing means 9 supplies a recording signal to a line 11 via an output 10. This recording signal can be recorded on a magnetic tape by recording means included in the signal processing apparatus 1 but not shown in FIG. 1.

The signal processing apparatus 1 further includes second signal input means 12 formed by a so-called SCART socket. A Pay-TV decoder 13 is connected to the second signal input means 12 via a SCART connector 14. The second signal input means 12 is connected to second signal processing means 15. The second signal processing means 15 is formed by a video/audio input/output stage. The second signal processing means 15 has a first output 16 connected to second signal output means 17, which is likewise formed by a SCART socket. The second signal processing means 15 has a second output 18 connected to the recording signal processing means 9 via a line 19, thus enabling signals processed by the second signal processing means 15 to be applied to the recording signal processing means 9 in order to be processed for the purpose of subsequent recording.

The signal processing apparatus 1 has power supply input means 20 to which electric power can be applied. For this purpose, the power supply input means 20 has two input terminals 21 and 22 connected to two conductors 23 and 24 of a line voltage cord 25 terminated with a line voltage plug.

The signal processing apparatus 1 further comprises power supply output means 27, which is essentially formed by a line voltage socket connector integrated in the signal processing apparatus 1. The power supply output means 27 comprises two sockets 28 and 29.

The signal processing apparatus 1 further has power supply connection means 30 via which the power supply output means 27 is connected to the power supply input means 20, and via which at least some of the power applied to the power supply input means 20 can be supplied to the power supply output means 27. The power supply connection means 30 includes two connecting leads 31 and 32, the connecting lead 31 connecting the input terminal 21 to the socket 28 and the connecting lead 32 connecting the input terminal 22 to the socket 29.

The signal processing apparatus 1 further comprises supply voltage generating means 33. The supply voltage generating means 33 is connected to the power supply input means 20 via two connecting leads 34 and 35. The supply voltage generating means 33 can generate at least one supply voltage. In the present case, the supply voltage generating means 33 can generate two supply voltages V1 and V2. The first supply voltage V1 can be applied to the first signal processing means 4 and second signal processing means 15 via a connecting lead 36. The second supply voltage V2 can be applied to the front-end stage 8 and the recording signal processing means 9 via a connecting lead 37.

The signal processing apparatus 1 is adapted not only to receive signals and to process signals, but also to supply signals to a second apparatus 40. In the apparatus combination shown in FIG. 1, the second apparatus 40 is formed by a television receiver.

The second apparatus 40 comprises power supply input means 41 comprising two input terminals 42 and 43. Two conductors 44 and 45 of a line voltage cord 46 lead to the two input terminals 42 and 43. The line voltage cord 46 is terminated with a line voltage plug 47 whose plug pins 48 and 49 engage in the sockets 28 and 29 of the power supply output means 27 of the signal processing apparatus 1. Controllable disconnection means 50 is connected to the power supply input means 41, and enables the power supply input means 41 to be either connected to supply voltage generating means 51 of the second apparatus 40 or to be disconnected from the supply voltage generating means 51. The disconnection means 50 is shown diagrammatically. In practice, the disconnection means is realized with the aid of electronically controllable switching means. The supply voltage generating means 51 is adapted to generate at least one supply voltage. In the present case, only a supply voltage V3 of the generated supply voltages is indicated, this supply voltage being supplied to a connection 52.

The second apparatus 40 includes control means 53 capable of performing a plurality of control functions. The control means 53 can also control the disconnection means 50 via a connection 54, namely, between a disconnecting state and a connecting state. The control means 53, in turn, can be controlled by remote control means 55 in that the remote control means 55 transmits control commands to a remote control receiver 57 of the second apparatus 40 via a remote control transmitter 56, these control commands being applied from the remote control receiver 57 to the control means 53, and converted into corresponding control commands, i.e., control information or control signals, by the control means 53.

The second apparatus 40 further comprises first signal input means 58 and second signal input means 59. The second signal input means 59 is formed by a SCART socket. Both the first signal input means 58 and the second signal input means 59 are coupled to the signal processing means 60 by which signals applied to the second apparatus 40 via the signal input means 58 and 59 can be processed, after which the processed signals can be reproduced, the processed picture signals being reproducible by means of a display tube 61 and the processed audio signals being reproducible by means of a loudspeaker 62.

With regard to the second apparatus 40, it is to be noted that by means of the remote control means 55, a power-on command can be applied to the second apparatus 40, this command being processed by the control means 53 and, inter alia, causeing the control means 53 to set the disconnection means 50 to the connecting state via the connection 54, the power supply input means 41 then being connected to the supply voltage generating means 51, as a result of which, the supply voltage generating means 51 generates supply voltages, including the supply voltage V3, and applies them to those parts of the second apparatus 40 which require these supply voltages. The second apparatus 40 then consumes power which is applied to the second apparatus 40 via the line voltage plug 26 of the signal processing apparatus 1, which should obviously be or have been plugged into a line voltage outlet, and via the line voltage cord 25 as well as the power supply input means 20, the power supply connection means 30, the power supply output means 27, the line voltage plug 47, the line voltage cord 46, the power supply input means 41 and the disconnection means 50, and is converted by the supply voltage generating means 51.

It is advantageous to provide the signal processing apparatus 1 with detection means 70 in the area of the power supply connection means 30, this detection means being adapted to detect the occurrence or non-occurrence of a supply of power to the power supply output means 27 and, consequently, to the second apparatus 40. When the non-occurrence of a supply of power to the power supply output means 27 is detected, the detection means 70 is adapted to generate and supply a first detection signal DS1 to an electrically conductive connection 71. When the occurrence of a supply of power to the power supply output means 27 is detected, the detection means 70 is adapted to generate and supply a second detection signal DS2 to the electrically conductive connection 71. The first detection signal DS1 is formed by a low potential. The second detection signal DS2 is formed by a high potential.

The signal processing apparatus 1 further includes disconnection means 72 between the power supply input means 20 and the supply voltage generating means 33. The disconnection means 72 is shown diagrammatically in FIG. 1. The disconnection means 72 may comprise, for example, relay-like switching means. In the present case, the disconnection means 72 is formed by electronically controllable switching means. The disconnection means 72 is included in the two connecting leads 34 and 35, and the disconnection means 72 ensures that the power supply input means 20 is either connected to the supply voltage generating means 33 or is disconnected from the supply voltage generating means 33. The disconnection means 72 is controllable, namely, in such a manner that when the first detection signal DS1 occurs, it is adapted to disconnect the supply voltage generating means 33 from the power supply input means 20, and when the second detection signal DS2 occurs, it is adapted to connect the supply voltage generating means 33 to the power supply input means 20. In the first-mentioned case, the supply voltage generating means 33 cannot generate a supply voltage, while in the second case, the supply voltage generating means 33 can generate at least the first supply voltage V1 to be applied to the first signal processing means 4 and to the second signal processing means 15, and can apply this voltage to the signal processing means 4 and 15.

The signal processing apparatus 1 advantageously has control means 73 arranged between the detection means 70 and the disconnection means 72, and is realized by a microprocessor. The control means 73 enables a multitude of control functions to be performed, but these control functions are not described herein because they are not relevant in the present case. However, it is to be noted that it is also possible to apply control commands to the control means 73 of the signal processing apparatus 1 by remote control means, not shown, via a connection 74. Examples of these control commands are a control command "off" for turning off the signal processing apparatus 1, a control command "on" for turning on the signal processing apparatus 1, and a control command "standby" for setting the signal processing apparatus 1 to a standby mode.

The control means 73 can generate three control signals SS1, SS2 and SS3 which can be applied to the disconnection means 72 and to the supply voltage generating means 33 via a connection 75. The control signal SS1 is generated when the control command "off" has been applied to the control means 73 via the connection 74, or when the control command "standby" has been applied to the control means 73 via the connection 74 and, in addition, the first detection signal DS1 has been applied via the connection 71. The second control signal SS2 is generated by the control means 73 when the control command "on" has been applied to the control means 73 via the connection 74. The third control signal SS3 is generated by the control means 73 when the control command "standby" has been applied to the control means 73 via the connection 74 and, in addition, the second detection signal DS2 has been applied via the connection 71.

The first control signal SS1 causes the disconnection means 72 to be set to the disconnecting state and, though this is not strictly necessary, the supply voltage generating means 73 to be deactivated.

The second control signal SS2 causes the disconnection means 72 to be set to the connecting state and the supply voltage generating means 33 to be activated in such a manner that it generates both supply voltages V1 and V2 and supplies these voltages to the connecting leads 36 and 37, as a result of which, in this case, both the first signal processing means 4 and the second signal processing means 15, as well as the front-end stage 8 and the recording signal processing means 9, are energized with their respective supply voltages V1 and V2.

The third control signal SS3 causes the disconnection means 72 to be set to the connecting state and the supply voltage generating means 32 to be activated so as to generate and supply only the first supply voltage V1, as a result of which, in this case, only the first signal processing means 4 and the second signal processing means 15 are powered with the first supply voltage V1 via the connecting lead 36.

The operation of the signal processing apparatus 1 shown in FIG. 1, insofar as it is relevant in the present context, will be explained hereinafter.

It is assumed that the signal processing apparatus 1 receives the control command "off" and, consequently, the control command "off" is applied to the control means 73 via the connection 74. As a result of this, the control means 73 supplies the first control signal SS1 to the connection 75 and, as a consequence, the disconnection means 72 is set to the disconnecting state and the supply voltage generating means 33 is deactivated and thus does not supply a supply voltage.

When, subsequently, the control command "on" is applied to the signal processing apparatus 1, the control command "on" is applied to the control means 73 via the connection 74, upon which the control means 73 supplies the second control signal SS2 to the connection 75, as a result of which, the disconnection means 72 is set to the connecting state and the supply voltage generating means 33 is activated in such a manner that it supplies both supply voltages V1 and V2. In this operating condition, the signal processing apparatus 1 can perform, for example, a recording process or reproducing process as well as further processes.

When, subsequently, the control command "standby" is applied to the signal processing apparatus 1, this causes the control command "standby" to be applied to the control means 73 via the connection 74.

It is now assumed that during and after the application of the control command "standby" to the control means 73, the second apparatus 40 is in its off state, i.e., it has not been switched on. This means that the second apparatus 40 does not consume any power, i.e., no power is supplied to the power supply output means 27 of the signal processing apparatus 1. As a result of this, the detection means 70 detects a non-occurrence of a supply of power to the power supply output means 27 and, consequently, generates the first control signal DS1 and applies this control signal to the control means 73 via the connection 71. Thus, the control command "standby" and the first detection signal DS1 are available in the control means 73, as a result of which, the control means 73 generates the first control signal SS1 and supplies this to the connection 75. This, in turn, causes the disconnection means 72 to be set to the disconnecting state and the supply voltage generating means 33 to be fully deactivated. Thus, substantially no power is consumed when the signal processing apparatus 1 is in its standby mode while the second apparatus 40 is in its off state.

When the second apparatus 40 is now switched on by the remote control means 55 while the signal processing apparatus 1 is in its standby mode, this leads to power consumption in the second apparatus 40, as a result of which, power is supplied to the power supply output means 27 of the signal processing apparatus 1 via the power supply connection means 30. The occurrence of a supply of power to the power supply output means 27 is then detected by the detection means 70, upon which the detection means 70 generates the second detection signal DS2 and applies this to the control means 73 via the connection 71. Thus, the control command "standby" and the second detection signal DS2 are then available in the control means 73. As a result of this, the control means 73 generates the third control signal SS3 and supplies this to the connection 75. The disconnection means 72 is consequently set to the connecting state and the supply voltage generating means 33 is activated so as to supply only the first supply voltage V1, which is then applied to the first signal processing means 4 and to the second signal processing means 15 via the connecting lead 36.

Thus, with the aid of the first signal processing means 4, a television signal received by the antenna 2 or a television signal decoded by means of the Pay-TV decoder 13 can be applied to signal processing means 60 of the second apparatus 40 and can be reproduced by means of the second apparatus 40. This has the advantage that in the signal processing apparatus 1, only the necessary circuit parts are powered, namely, the signal processing means 4 and 15 with the first supply voltage V1, while all the other circuit parts of the signal processing apparatus 1 which are not necessary for reproduction by means of the second apparatus 40 are not powered, i.e., consume no power.

Thus, in the signal processing apparatus 1 in accordance with the invention shown in FIG. 1, it is achieved, in a reliable and simple manner, that both in the switched-off state and in the standby state, no power at all is consumed as long as the second apparatus 40 is in its switched-off condition, and that there is only a minimal power consumption when the second apparatus is switched on while the signal processing apparatus 1 is in its standby state.

Figure 2:
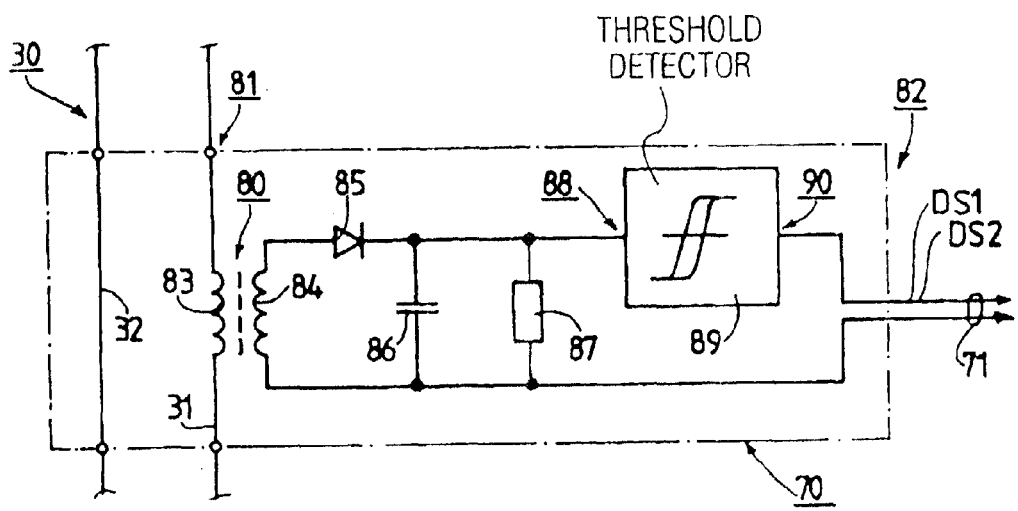
FIG. 2 shows detection means of the signal processing apparatus shown in FIG. 1.

FIG. 2 shows the detection means 70 of the signal processing apparatus 1 in detail. The detection means 70 includes a transformer 80 provided as a potential isolating means to provide electrical isolation between the power supply connection means 30, arranged at the input side 81 of the detection means 70, and the output side 82 of the detection means 70. The transformer 80 comprises a first transformer coil 83, which is included in the connecting lead 31, and a second transformer coil 84, which is inductively coupled to the first transformer coil 83. A diode 85 is connected to the second transformer coil 84 as a rectifier via which a storage capacitor 86 can be charged, this capacitor being arranged in parallel with a resistor 87. The input side 88 of a threshold detector 89 is connected to the parallel arrangement of the storage capacitor 86 and the resistor 87, this threshold detector preferably exhibiting hysteresis. At its output side 90, the threshold detector 89 supplies the first detection signal DS1 and the second detection signal DS2, namely, the first detection signal DS1 when no current flows through the first transformer coil 83 and the second detection signal DS2 when a current flows through the first transformer coil 83.

Figure 3:
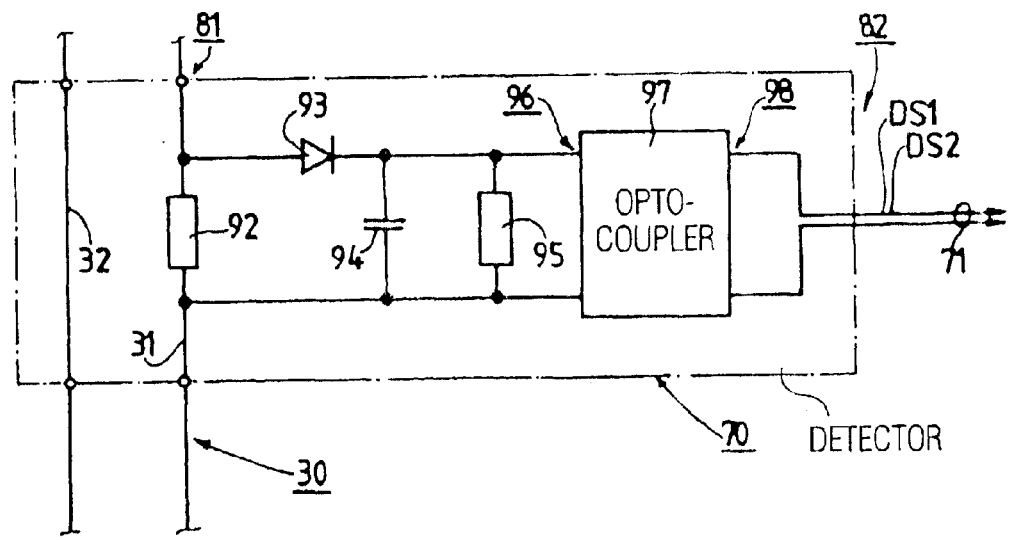
FIG. 3 shows detection means of a signal processing apparatus in accordance with a second embodiment of the invention.

FIG. 3 shows detection means 70 of a signal processing apparatus in accordance with a second embodiment of the invention. The detection means 70 shown in FIG. 3 includes a resistor 92 included in the connecting lead 31, this resistor being connected to a diode 93 via which a storage capacitor 94, arranged in parallel with a resistor 95, can be charged. An opto-coupler 97 has its input side connected to the parallel arrangement of the storage capacitor 94 and the resistor 95 and serves as a potential isolating means to provide electrical isolation between the power supply connection means 30, arranged at the input side 81 of the detection means 70, and the output side 82 of the detection means 70. At the output side 98 of the opto-coupler 97, the opto-coupler 97 supplies the first detection signal DS1 and the second detection signal DS2, namely, the first detection signal DS1 when no current flows through the resistor 92 and the second detection signal DS2 when a current flows through the resistor 92.

The invention is not limited to the two embodiments described hereinbefore by way of example. Further variants can be used, particularly for the implementation of the detection means 70. Moreover, it is to be noted that the detection signals DS1 and DS2 which can be generated by the detection means 70 may alternatively be applied directly to the isolating means 72. The signal processing apparatus 1 may also be formed by an apparatus other than a video recorder, and the second apparatus 40 may also be formed by an apparatus other than a television receiver.

What is claimed is:

1. An audio and/or video signal processing apparatus for supplying audio and/or video signals to a second apparatus, said audio and/or video signal processing apparatus comprising:

first power supply input means for receiving electric power;

power supply output means connectable to second power supply input means of the second apparatus;

power supply connection means for connecting the power supply output means to the first power supply input means and via which at least a part of the power applied to the first power supply input means is applied to the power supply output means;

supply voltage generating means coupled to the first power supply input means for generating at least one supply voltage;

audio and/or video signal processing means for receiving said at least one supply voltage generated by the supply voltage generating means, said audio and/or video signal processing means processing at least one audio and/or video signal and supplying at least one processed audio and/or video signal to be transferred to the second apparatus; and signal output means for receiving the processed audio and/or video signal from the audio and/or video signal processing means, said signal output means being connectable to signal input means of the second apparatus, characterized in that said audio and/or video signal processing apparatus further comprises:

detection means coupled to the power supply connection means for detecting an occurrence or non-occurrence of a supply of power to the power supply output means and, when the non-occurrence of a supply of power to the power supply output means is detected, for generating and supplying a first detection signal and, when the occurrence of a supply of power to the power supply output means is detected, for generating and supplying a second detection signal; and disconnection means coupled between the first power supply input means and the supply voltage generating means, said disconnection means disconnecting the supply voltage generating means from the first power supply input means in the case of an occurrence of the first detection signal, and connecting the supply voltage generating means to the first power supply input means in the case of an occurrence of the second detection signal, the supply voltage generating means then generating the at least one supply voltage and applying the at least one supply voltage to the signal processing means.

2. The audio and/or video signal processing apparatus as claimed in claim 1, characterized in that said audio and/or video signal processing apparatus further comprises control means, formed by a microprocessor, coupled between the detection means and the disconnection means.

3. The audio and/or video signal processing apparatus as claimed in claim 1, characterized in that the audio and/or video signal processing apparatus is a video recorder, and the second apparatus is a television receiver in which the second power supply input means and the signal input means is connected to the power supply output means of the video recorder.

4. The audio and/or video signal processing apparatus as claimed in claim 3, characterized in that the audio and/or video signal processing means comprises an antenna signal processing stage in combination with a signal splitting stage.

5. The audio and/or video signal processing apparatus as claimed in claim 3, characterized in that the audio and/or video signal processing means comprises a video/audio input/output stage.

6. The audio and/or video signal processing apparatus as claimed in claim 1, characterized in that the detection means includes potential isolating means for providing an electrical isolation between the power supply connection means arranged at an input side of the detection means and an output side of the detection means.

* * * * *